United States Patent
Jolivet

(10) Patent No.: US 6,669,973 B1
(45) Date of Patent: Dec. 30, 2003

(54) ASSEMBLY COMPRISING A CONTAINER AND A READY-TO-DRINK BEVERAGE

(75) Inventor: Elise Jolivet, Nort sur Erdre (FR)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/520,153

(22) Filed: Mar. 7, 2000

(30) Foreign Application Priority Data

Mar. 8, 1999 (EP) .............................................. 99104547

(51) Int. Cl.⁷ .................................................. A23C 9/14
(52) U.S. Cl. ....................... 426/115; 426/131; 426/569; 426/580; 426/590
(58) Field of Search .......................... 426/34, 115, 590, 426/580, 130, 131, 569

(56) References Cited

U.S. PATENT DOCUMENTS

| | | | |
|---|---|---|---|
| 4,696,580 A | 9/1987 | Kameda | 374/162 |
| 4,832,968 A | 5/1989 | Forage et al. | 426/112 |
| 4,919,960 A * | 4/1990 | Ahmed et al. | 426/580 |
| 4,935,255 A | 6/1990 | Anderson et al. | 426/316 |
| 4,996,823 A | 3/1991 | Byrne | 53/410 |
| 5,009,901 A | 4/1991 | Byrne | 426/112 |
| 5,251,424 A | 10/1993 | Zenger et al. | 53/431 |
| 5,817,351 A * | 10/1998 | DeWille et al. | 426/74 |
| 6,403,137 B1 * | 6/2002 | Frutin | 426/477 |

FOREIGN PATENT DOCUMENTS

| | | |
|---|---|---|
| EP | 0 812 544 | * 12/1997 |
| FR | 1 538 716 | 9/1968 |
| GB | 2 089 191 | 6/1982 |
| GB | 2 183 592 | 6/1987 |
| GB | 2 299 978 | * 10/1996 |
| WO | 463696 B1 | * 1/1996 |
| WO | WO 98/36671 | * 8/1998 |

* cited by examiner

Primary Examiner—Nina Bhat
(74) Attorney, Agent, or Firm—Winston & Strawn LLP

(57) ABSTRACT

The present invention relates to an assembly that includes a ready-to-drink, long lasting, milk based beverage inside of a container. The beverage is under pressure and contains between about 0.5 and 5 g/l of nitrous oxide or carbon dioxide. The container has a head space of from about 9 to 15%, relative to the total volume of the said container. The said space is saturated with nitrogen so as to have a relative pressure of between 1.5 and 4 bar.

10 Claims, No Drawings

US 6,669,973 B1

ASSEMBLY COMPRISING A CONTAINER AND A READY-TO-DRINK BEVERAGE

TECHNICAL FIELD

The present invention relates to a beverage assembly comprising a container containing a ready-to-drink, long-life beverage that is under pressure.

BACKGROUND ART

GB patent 2 299 978 relates to a ready-to-drink beverage that is under pressure and packaged in a container. The beverage is milk-based and contains nitrous oxide or carbon dioxide. There are, however, drawbacks associated with this packaging system. At the time of use, i.e., at the moment the consumer opens the container, the amount of foam obtained is minimal. The beverage is only pasteurized and thus must be kept in a refrigeration unit when it is placed on sale. Also no head space has been provided to prevent the foam that forms when the container is opened from overflowing from the container. Thus, the beverage is designed to only be drunk cold.

U.S. Pat. Nos. 4,996,823 and 5,009,901 relates to a wrapping for a beverage and a process for wrapping a beverage in which the beverage is packaged in two separate chambers. The main chamber contains the beverage and the secondary chamber, which is smaller in volume, and contains a gas. The secondary container has an orifice that is pierced when the container is opened so that the gas escapes through the orifice and creates a foam at the surface of the beverage. The drawback of this system is that it is a complicated system and is expensive to manufacture.

There is a need to provide consumers with a ready-to-drink beverage that develops a thick, long-lasting foam when the container in which it is packaged is opened, that can be stored at room temperature for at least one year, that does not overflow when the consumer opens the container, and can be consumed either hot or cold. The present invention now satisfies this need.

SUMMARY OF THE INVENTION

The present invention relates to a beverage product that includes a closed container and a milk-based beverage therein. The milk-based beverage is a ready to drink, long-life beverage that contains between about 0.5 and 5 g/l of a dissolved gas. The beverage fills the container to a fill level of at least about 85% of the total volume of the container and the container has a head space of at least about 9 of the total volume of the container. The head space is pressurized to between about 1.5 and 4 bar, such that upon opening the container and pouring of the beverage into a glass a foam is provided on the beverage.

The container may be a metallic wrapping or a glass or plastic bottle. The container may be an aluminum can or a polyester or polyterphthalate bottle The dissolved gas may be nitrous oxide or carbon dioxide. The container volume may be about 85 to 91% of the beverage and 9 to 15% of the head space.

The beverage may contain at least 50% of a milk and may optionally contain a sweetener, a stabilizer, a thickener, or mixtures thereof. For a beverage that contains at least 50% milk the beverage may be pasteurized and may includes one or more of a sugar, an artificial sweetener, coffee, cocoa, chocolate, a fruit flavor, or a cola. The beverage may also include one or more of acidified milk or fermented milk and may include one or more of a phosphate, citrate, hydrocolloid, or mixtures thereof.

The present invention also relates to a process for manufacturing the beverage product. The process includes the steps of preparing a milk based beverage, pasteurizing the beverage, dissolving about 0.5 to 5 g/l of a gas into the beverage, filling the container with the beverage to a fill level of at least about 85% by volume while providing a head space of at least 9% by volume of the container, and pressurizing the head space to between about 1.5 and 4 bar. The gas may be nitrous oxide or carbon dioxide and may be injected into the beverage. The head space may be pressurized by injecting a liquid gas into the beverage. The liquid gas may be liquid nitrogen and may be injected in an amount between about 0.1 and 3 g per 40 ml of head space. The process may further include the step of sterilizing the product.

The invention also relates to a method of providing a foamed beverage that includes the steps of formulating the above-described beverage product, opening the container, and pouring the beverage into a glass to obtain a foamed product. Another method of providing a foamed beverage includes the steps of preparing a beverage product according to the above-described method, opening the container, and pouring the beverage into a glass to obtain a foamed product.

DETAILED DESCRIPTION OF THE PREFERRED EMBODIMENTS

The present invention relates to a product comprising a container and, placed inside the container, a long-life beverage that is under pressure. The beverage is preferably a milk-based beverage containing between about 0.5 and 5 g/l of an inert gas such as nitrous oxide or carbon dioxide. The container has a head space of from about 9 to 15% of the total volume of the container and is saturated with an inert gas such as nitrogen so as to have a relative pressure of between about 1.5 and 4 bar. When the container is opened and the beverage is poured in a glass, a foam is produced on top of the beverage.

By "long-life beverage" is meant a beverage that can be stored at room temperature for at least one year. By ready-to-drink beverage is meant a beverage that can be consumed immediately after the container is opened and requires no other preparation before being consumed. Ready-to-drink beverages, however, include beverages that are intended to be consumed while hot or cold and may require cooling or heated before or after the container is opened.

It has surprisingly been found that by saturating the head space with an inert gas such as nitrogen it is possible to maintain a pressure in the container so that the nitrous oxide or carbon dioxide remains in the solution instead of escaping into the head space. A large amount of foam is obtained only when the amount of gas dissolved in the beverage, e.g., nitrous oxide or carbon dioxide, and the amount of gas in the head space, e.g., nitrogen, are as specified herein. At the time of pouring, the ready-to-drink product has a foam volume which is between about 1 and 5 cm thick. If the amount of dissolved gas falls below about 0.5 g/l then the amount of foam to be provided is generally insufficient. If the amount of dissolved gas exceeds about 5 g/l then the pressure is too high to permit sterilization without deforming the container.

The type of container is not critical. It is possible to use for example, a metallic wrapping or a glass or plastic bottle. In the case of a metallic wrapping, the container is preferably an aluminium can with an easy-open system. Such containers are well known to those of ordinary skill in the art. In the case of a bottle, a plastic bottle is preferable, such as, for example, a polyester or polyethylene terephthalate (PET) bottle.

By "milk-based beverage" is meant a beverage containing more than about 50 percent and preferably at least about 75 percent, and more preferably about 80 to 95 percent of a milk. The milk may be one or more of diluted milk, normal milk, whole milk, fully skimmed or partially skimmed milk, or concentrated milk. Acidified or fermented milk can also be used. Advantageously, one or more flavorings such as coffee (powder or extract), cocoa, chocolate, cola, fruit flavors, or the like are included. The milk-based beverage can contain lactic fat or other exogenous fat, such as palm oil, rapeseed oil, soybean oil, or a mixture thereof.

In the present description, the expression "diluted milk" means a milk containing more than about 0.5% of non-fat solids, preferably between about 0.5 and 8.5% of non-fat solids. The expression "normal milk" means a standard commercial milk, for example one with a nonfat solids content of between about 8.5 and 9%. The expression "concentrated milk" means a milk with a nonfat solids content of more than about 14%, preferably a nonfat solids content of between about 14 and 20%. The expression skimmed milk means a milk with practically no fat (i.e., less than 1.5 percent fat). The expression partially skimmed milk means a milk containing between 1.5 and 26 percent fat. The expression "milk with added coffee powder" means a milk base to which is added instant coffee powder, for example between about 0.2 and 4 g of powder per liter of milk. The expression "milk with added flavorings" means a milk base with any type of flavoring, for example, a chocolate flavoring or a fruit flavoring, such as strawberry flavoring, raspberry flavoring, banana flavoring, and the like. The expression "acidified milk" means a milk base acidified to a pH of between about 4.4 and 3.5 by addition of a food grade organic acid such as citric acid, lactic acid, malic acid, or any other acid or mixture of acids commonly used in the agrifood industry. The expression "fermented milk" means a milk base such as yogurt, keffiyeh, or other milk base fermented by one or more strains of lactobacillus or bifidobacterium.

The milk base may also contain one or more sugars; stabilizers such as phosphates or citrates; thickeners, for example, hydrocolloids (such as pectins in the case of an acidified or fermented milk); and flavorings typically used in the food industry. Sugar may be present in an amount of up to about 25 percent, preferably up to about 15 percent and more preferably up to about 10 percent. Stabilizers may be present in an amount of up to about 10 percent, preferably up to about 5 percent, and more preferably up to about 2 percent. Thickeners may be present in an amount of up to about 10, preferably up to about 5 percent, and more preferably up to about 2 percent. Flavoring may be present in an amount of up to about 10 percent, preferably up to about 5 percent, and more preferably up to about 2 percent.

The present invention also relates to a process for manufacturing the assembly comprising the container and the ready-to-drink beverage. The process includes the steps of preparing a milk base, pasteurizing the milk base, injecting nitrous oxide or carbon dioxide into the milk base, filling a container with the milk base to a fill level of between about 85 and 91%, injecting liquid nitrogen into the head space, closing the container, and sterilizing the closed container.

The milk base is prepared by mixing together all the constituents, for example, milk, coffee if the beverage is coffee-flavored, flavorings, sugar, stabilizers, and the like. This mixture is then pasteurized by any means typically used in the milk industry. Means for pasteurizing milk are readily known to those of ordinary skill in the art and include, for example, using a tubular or plate exchanger. The gas is then injected into the milk base. For a product of neutral pH it is preferable to use nitrous oxide. For an acidic product it is preferable to use carbon dioxide. The injection can be carried out by on line injection or by injection in a saturation tank. The largest amounts of foam are obtained with pressures in the saturation tank of from about 0.4 to 0.6 bar, which corresponds to a concentration of nitrous oxide or of carbon dioxide of between about 0.5 and 5 g/l. In some cases, it is possible to obtain a larger amount of foam by using higher pressures. With higher pressures, however, the product does not offer optimum quality since the foam spurts out of the container when it is opened and the container becomes deformed during the sterilization due to the high pressure.

The containers, i.e., metal cans, polyester bottles, or any other container which can withstand pressure, are filled using filling machines which are commonly used for filling containers with gassy liquids. The container is filled to between about 85 and 91% in order to leave a head space for the development of the foam. An amount of between about 0.1 and 0.3 g of liquid nitrogen for a head space of about 40 ml is then injected into the head space in order to prevent the dissolved gas from escaping into the head space and, thus, causing the beverage to lose its foaming property. The amount of liquid nitrogen makes it possible to obtain a relative pressure in the container of between 1.5 and 4 bar. The container is then closed, for example by crimping. The ready-to-drink product is then sterilized, for example, in a sterilizer at 116° C. for 12 minutes. The sterilization requires counter-pressures that are relatively high compared with those used during the sterilization of milk products which do not contain any gas. The maximum pressure recorded in the cans is 9 bar.

EXAMPLES

The invention is further defined by reference to the following examples describing in detail the beverage assembly and methods of the present invention. The examples are representative, and should not be construed to limit the scope of the invention in any way.

Example 1

A banana-flavored milk base is prepared containing 8.5% non-fat lactic solids, 1.6% lactic fat, 4% sugar, and banana flavorings. The milk base is placed in a saturation tank and nitrous oxide is injected into the milk base so as to reach a pressure in the tank of about 0.6 bar. An aluminum can is then filled with the beverage, leaving a head space of about 12%. An amount of liquid nitrogen is injected into the head space so that a pressure of about 2.4 bar develops in the can. The can is crimped and sterilized.

At the time of consumption, the ready-to-drink beverage generates a foam height of 1.5 cm after it has been poured into a glass.

Example 2

Comparative

A beverage assembly is prepared according to the process of Example 1 except that liquid nitrogen is not injected. The ready-to-drink beverage does not develop a foam when poured into a glass.

Example 3

Comparative

A beverage assembly is prepared according to the process of Example 1 except that a smaller amount of liquid nitrogen is injected into the head space, so as to give a total pressure in the can of 1.3 bar. The ready-to-drink beverage generates a foam height of only 0.5 cm. Such a foam height is considered insufficient.

Example 4

A coffee-flavored milk base is prepared containing 4% non-fat solids, 1% caseinate, 1% fat, 0.5% coffee powder, and 4% sugar. The milk base is stabilized with phosphates. Nitrous oxide is injected into the milk base in the same way as in Example 1. A can made of aluminum metal is then filled with the milk-based beverage, leaving a head space of about 12%. An amount of liquid nitrogen is injected into the head space such that the final pressure is 2.5 bar. The final product is sterilized in an autoclave. At the time of consumption, the product generates a foam with a height of 3.5 cm. The product is a ready-to-drink cappuccino which foams when the can is opened.

Example 5

Comparative

A beverage assembly is prepared according to the process of Example 4 except the amount of liquid nitrogen injected into the head space gives a final pressure in the can of only 1 bar. The ready-to-drink product generates a foam height of only 0.5 cm.

Example 6

A milk base is prepared containing 1.8% non-fat solids, 9% sugar, and 0.001% alginate. The milk base is chemically acidified or fermented. The pH of the beverage is 3.8. The beverage is pasteurized and carbon dioxide is injected therein according to the process used in Example 1. The pressure in the storage tank is 0.4 bar. Metal cans are filled with the beverage so that they have a head space of about 12% of the total volume of the can. Liquid nitrogen is injected into a head space such that the pressure in the can reaches about 3.5 bar. The cans are sterilized in an autoclave at 85° C. for 15 minutes. The final product generates a foam height of 2 cm after opening.

Example 7

Comparative

A beverage assembly is prepared according to the process of Example 6 except that the pressure in the storage tank is 1 bar. The ready-to-drink beverage spurts out of the container when it is opened.

What is claimed is:

1. A beverage product comprising a single closed container and a milk-based beverage therein, wherein the milk-based beverage is a ready to drink, long-life beverage that contains between about 0.5 and 5 g/l of a dissolved gas, and fills the container to a fill level of at least about 85% to about 91% of the total volume of the container and wherein the container has a head space of from about 9% to about 15% of the total volume of the container, the head space being pressurized to between about 1.5 and 4 bar, such that upon opening the container and pouring of the beverage into a glass a foam is provided on the beverage.

2. The product of claim 1, wherein the container is a metallic wrapping or a glass or plastic bottle.

3. The product of claim 2, wherein the container is an aluminum can or a polyester or polyterphthalate bottle.

4. The product of claim 1, wherein the dissolved gas is nitrous oxide or carbon dioxide.

5. The product of claim 1, wherein the beverage comprises at least 50% of a milk, optionally containing a sweetener, a stabilizer, a thickener, or mixtures thereof.

6. A beverage product comprising a closed container and a milk-based beverage therein, wherein the milk-based beverage comprises at least 50% of a milk, optionally containing a sweetener, a stabilizer, a thickener, or mixtures thereof, is pasteurized and includes one or more of a sugar, an artificial sweetener, coffee, cocoa, chocolate, a fruit flavor, or a cola, and is a ready to drink, long-life beverage that contains between about 0.5 and 5 g/l of a dissolved gas, and fills the container to a fill level of at least about 85% to about 91% of the total volume of the container and wherein the container has a head space of from about 9% to about 15% of the total volume of the container, the head space being pressurized to between about 1.5 and 4 bar, such that upon opening the container and pouring of the beverage into a glass a foam is provided on the beverage.

7. The product of claim 5, wherein the beverage includes one or more of acidified milk or fermented milk.

8. The product of claim 5, wherein the beverage includes one or more of a phosphate, citrate, hydrocolloid, or mixtures thereof.

9. A single container beverage product comprising a closed container and a milk-based beverage therein, wherein the milk-based beverage is pasteurized and includes one or more of a sugar, an artificial sweetener, coffee, cocoa, chocolate, a fruit flavor, or a cola, and is a ready to drink milk, long-life beverage that contains between about 0.5 and 5 g/l of a dissolved gas, and fills the container to a fill level of at least about 85% to about 91% of the total volume of the container and wherein the container has a head space of from about 9% to about 15% of the total volume of the container, the head space being pressurized to between about 1.5 and 4 bar, such that upon opening the container and pouring of the beverage into a glass a foam is provided on the beverage.

10. The beverage product of claim 9, comprising at least 50% milk.

* * * * *

UNITED STATES PATENT AND TRADEMARK OFFICE
CERTIFICATE OF CORRECTION

PATENT NO. : 6,669,973 B1 Page 1 of 1
DATED : December 30, 2003
INVENTOR(S) : Jolivet It is certified that error appears in the above-identified patent and that said Letters Patent is hereby corrected as shown below:

Title page,
Item [56], References Cited, FOREIGN PATENT DOCUMENTS, change "WO 463696 B1" to -- EP 463696 B1 --.

Signed and Sealed this

Ninth Day of March, 2004

JON W. DUDAS
*Acting Director of the United States Patent and Trademark Office*